(12) United States Patent (10) Patent No.: US 7,953,833 B2
Ben-Shaul et al. (45) Date of Patent: May 31, 2011

(54) DESKTOP DELIVERY FOR A DISTRIBUTED ENTERPRISE

(75) Inventors: Israel Zvi Ben-Shaul, Palo Alto, CA (US); Ilan Kessler, Haifa (IL); Ady Degany, San Jose, CA (US); Shahar Glixman, Kiryat Tivon (IL)

(73) Assignee: Wanova Technologies Ltd., South Netanya (IL)

( * ) Notice: Subject to any disclaimer, the term of this patent is extended or adjusted under 35 U.S.C. 154(b) by 190 days.

(21) Appl. No.: 12/270,715

(22) Filed: Nov. 13, 2008

(65) Prior Publication Data

US 2009/0198805 A1 Aug. 6, 2009

Related U.S. Application Data

(60) Provisional application No. 61/025,238, filed on Jan. 31, 2008, provisional application No. 61/042,379, filed on Apr. 4, 2008.

(51) Int. Cl.
*G06F 15/177* (2006.01)

(52) U.S. Cl. ........................................ 709/222; 709/220

(58) Field of Classification Search .................. 709/220, 709/221, 222
See application file for complete search history.

(56) References Cited

U.S. PATENT DOCUMENTS

| 6,925,533 | B2 * | 8/2005 | Lewis ........................... 711/118 |
| 7,373,451 | B2 | 5/2008 | Lam et al. |
| 2003/0126242 | A1 | 7/2003 | Chang et al. |

FOREIGN PATENT DOCUMENTS

WO   WO 2006/013559   2/2006

OTHER PUBLICATIONS

Title: Virtual disk based centralized management for enterprise networks Authors Yuezhi Zhou, Yaoxue Zhang, Yinglian Xie Pisa, Italy pp. 23-28 Year of Publication: 2006.*
PCT/US2009/031258, International Search Report, May 28, 2009, Metis Computing Technologies, Ltd., pp. 1-7.

(Continued)

*Primary Examiner* — Joseph E Avellino
*Assistant Examiner* — Marshall McLeod
(74) *Attorney, Agent, or Firm* — Hickman Palermo Truong & Becker LLP

(57) ABSTRACT

Techniques are provided for desktop delivery in a distributed enterprise. In one embodiment, a system comprises multiple computing devices that are communicatively connected to a data center. The data center comprises a separate virtual disk for each separate computing device. A virtual disk for a computing device comprises an image that includes: an Operating system (OS) for the computing device; one or more applications for a user of the computing device; a machine profile associated with the computing device; and user data and settings that are specific for the user of the computing device. The data center also comprises logic which is stored in a storage medium and which, when executed at the data center, is operable at least to: send the image to the computing device; receive, from the computing device, changes made by the user at the computing device to each of the OS, the one or more applications, and the user data; and update the image for the computing device by applying the changes to each of the OS, the one or more applications, and the user data.

33 Claims, 4 Drawing Sheets

OTHER PUBLICATIONS

PCT/US2009/031258, Written Opinion, May 28, 2009, Metis Computing Technologies, Ltd., pp. 8-15.

PCT/US2009/031258, Current Claims, May 28, 2009, Metis Computing Technologies, Ltd., 9 pgs.

Zhou, Y. et al., "Virtual Disk based Centralized Management for Enterprise Networks", SIGCOMM Workshop, Sep. 11, 2006, Pisa, Italy, XP 002527892.

Ramesh Chandra et al., "The Collective: A Cache-Based System Management Architecture", $2^{nd}$ Symposium on Networked Systems Design and Implementation, May 2, 2005, Boston, MA.

Constantine Sapuntzakis et al., "Virtual Appliances in the Collective: A Road to Hassle-Free Computing", Proceedings of HostOS IX: The $9^{th}$ Workshop on Hot Topics in Operating Systems, Lihue, Hawaii, May 18-21, 2003.

Constantine Sapuntzakis et al., "Virtual Appliances for Deploying and Maintaining Software", Proceedings of the $17^{th}$ Large Installation Systems Administration Conference, San Diego, California, Oct. 26-31, 2003.

* cited by examiner

DESKTOP DELIVERY FOR A DISTRIBUTED ENTERPRISE

PRIORITY CLAIM

This application claims benefit and priority under 35 U.S.C. §119(e) to U.S. Provisional Patent Application Ser. No. 61/025,238, filed on Jan. 31, 2008 and titled "DESKTOP DELIVERY FOR A DISTRIBUTED ENTERPRISE", the entire contents of which is hereby incorporated by reference as if fully set forth herein; this application also claims benefit and priority under 35 U.S.C. §119(e) to U.S. Provisional Patent Application Ser. No. 61/042,379, filed on Apr. 4, 2008 and titled "APPROACHES FOR DESKTOP DELIVERY IN A DISTRIBUTED ENTERPRISE", the entire contents of which is hereby incorporated by reference as if fully set forth herein.

TECHNICAL FIELD

This disclosure relates generally to managing and delivering data in a distributed system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Enterprise desktop management generally refers to managing, protecting, and distributing the disk contents of a large number of computers in an enterprise such as, for example, a company, an educational institution, or a government or non-government organization. Enterprise desktop management is one of the most challenging Information Technology (IT) tasks for several reasons.

One reason is the complexity of managing a large number of different desktop instances that may exist on enterprise computers. The sheer number of desktops to manage, the proliferation of Operating System (OS) images and applications, the complex set of operations to apply—including deployment and provisioning, upgrades, compliance testing, security patches, troubleshooting—all make the managing of enterprise desktops a very challenging task.

Content protection is another reason that makes enterprise desktop management a challenging task. Desktops are one of the main entry/exit points to/from the enterprise network, and they need to be protected to avoid compromising the security of the enterprise or loss of sensitive documents and data upon computer failure causing violations of compliance regulations.

Another reason that makes enterprise desktop management a challenging task is that nowadays most enterprises are dispersed over multiple geographic locations. The use of Local Area Networks (LANs) that are connected over one or more Wide Area Networks (WANs) with variable bandwidths and latencies is a serious barrier to providing efficient desktop management and tight protection of desktop contents. Further, laptop computers are often offline and thus inaccessible for remote IT management. They are often connected to the enterprise network via Virtual Private Network (VPN) links that have lower bandwidth, higher latency, and lower reliability. They can be used to bypass the enterprise network and to access the Internet directly, thus becoming completely exposed and unprotected. Laptop computers are much more prone to breakage, theft, and loss, and hence their desktop contents require an even stronger data protection as well as the ability to be recovered quickly from a loss of the physical laptop computer.

BRIEF DESCRIPTION OF THE DRAWINGS

In the figures of the accompanying drawings like reference numerals refer to similar elements.

DETAILED DESCRIPTION

Figure 1A:
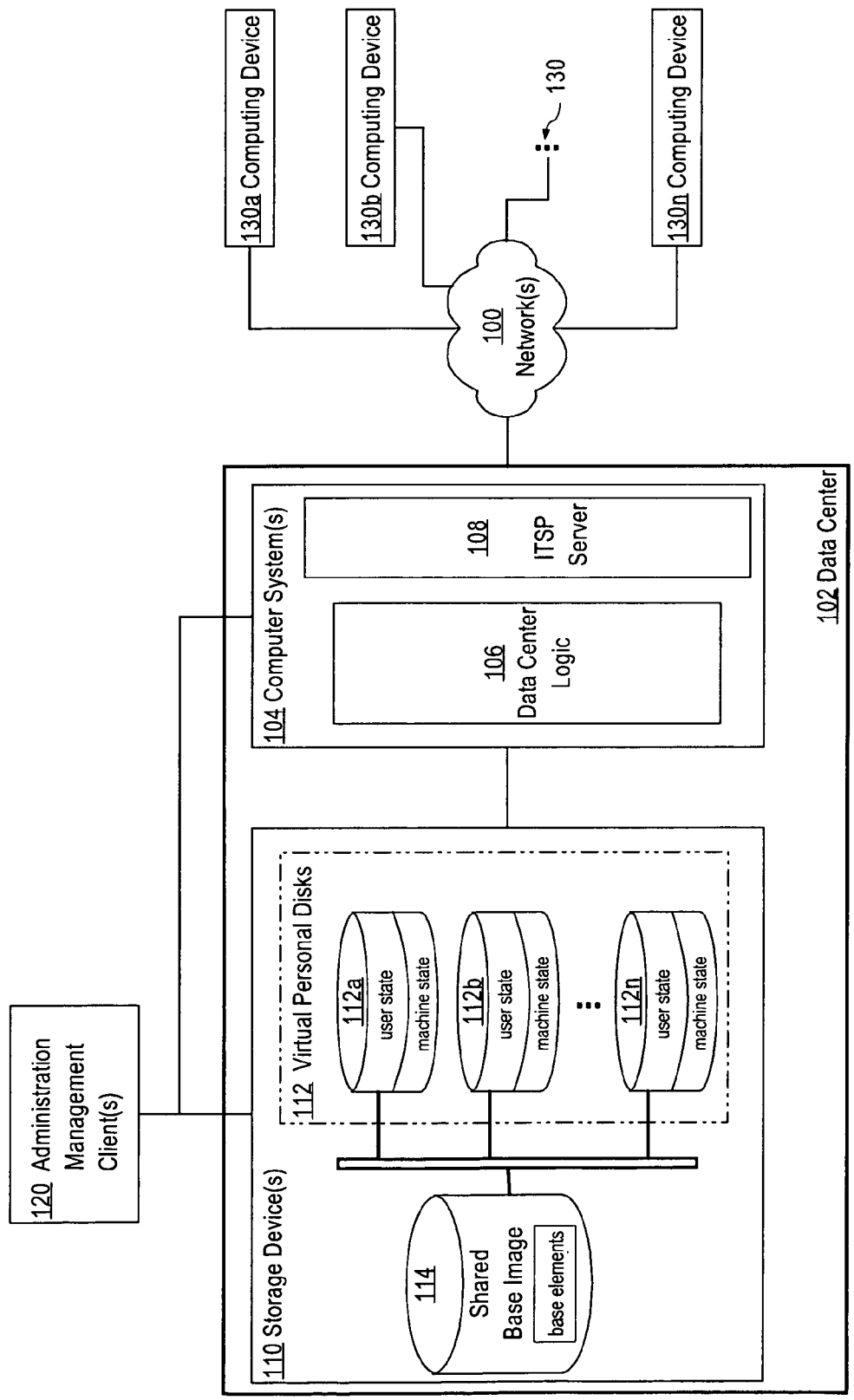
FIG. 1A is a block diagram that illustrates a system for desktop delivery and components of a data center according to an example embodiment.

Techniques are provided for desktop management and delivery in a distributed enterprise. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
  2.0 Techniques for Desktop Management and Delivery
  3.0 Example System for Desktop Management and Delivery
    3.1 Data Center Components
    3.2 Computing Device Components
    3.3 Additional Features and Embodiments
    3.4 Example Operational Contexts
  4.0 Self-Cache and Self-Cache Operation
  5.0 Implementation Mechanisms-Hardware Overview
  6.0 Extensions and Alternatives 1.0 General Overview The techniques for desktop management and delivery described herein introduce a novel new approach to enterprise desktop management. "Desktop" or "desktop instance" refers to disk content that is stored on a computing device. According to the techniques described herein, the entire disk contents (or desktops) of user computing devices are stored in a data center so that IT personnel can perform all management operations on the disk contents locally at the data center, thus avoiding any network delays or user interference. The disk content (or desktop) of a computing device may include, without limitation, the operating system (OS), the OS configurations, any software applications and user-specific configurations thereof, machine state and ID, user data, and user settings. The techniques described herein also provide for keeping self-cached copies of the disk contents on the respective computing devices, thus allowing the users to continue to operate and use their computing devices locally and offline (in the case of laptop computers or other mobile devices) with no change in user-expected behavior or computer performance. The techniques described herein also provide bi-directional capabilities to transfer, between the data center and the computing devices, any changes to the disk contents that are made both at the data center (e.g., by IT personnel) and at the computing devices (by the users). From the users' perspective, any such changes are made transparently and appear as if they were performed locally at the computing devices, although no management code actually ever executes on the computing devices. The techniques described herein provide guaranteed zero-propagation delay for disk content changes, and complete backups of disk contents that do not require execution of any backup agent at the computing devices.

As used herein, "computing device" refers to a computer system that is operable to execute an OS and software applications, and to store user data. Examples of computing devices include, but are not limited to, desktop computers, laptop computers, and wireless mobile devices such as personal digital assistants (PDAs) and smart phones like iPhone, BlackBerry, and Treo. Another example of a computing device is a virtual machine, such as VMware's player, or ESX, which executes an OS and applications just like any other hardware, except the hardware is emulated with software. It is noted that the techniques for desktop management and delivery described herein are not limited to being implemented for any particular type of computing device; rather the techniques described herein may be implemented on any computing device that is operable to execute an OS and software applications and to store user data. For this reason, the examples of computing devices provided herein are to be regarded in an illustrative rather than a restrictive sense.

The term "operating system" (or "OS") is used herein in its commonly accepted meaning and refers to a software component that is responsible for the allocation, management, coordination, and sharing of computer system resources that are used by other applications or components of a computing device. Examples of such computing resources include, without limitation, Central Processing Units (CPUs or processors), memory, disk storage space, network communication interfaces, and various peripheral devices such as a video display (e.g., a monitor), a pointing device (e.g., a mouse), and a keyboard. When executed on a computing device, an OS controls the operation of the computer system hardware and provides a number of services to user(s) of the computing device and to software applications that execute on the computing device. Examples of such services include, without limitation, file system services that allow for storing and maintaining files on storage devices, memory management services that allocate and manage dynamic memory for software applications, network management services that provide for network access, user interface services (e.g., shells, command line interfaces, and graphical user interfaces) that allow users to submit commands directly to the OS, user logon and other user-related security services, and a number of other services that provide various functionalities to the software applications that may execute on a computing device. Typically, a software application is operable to request a service from the OS by making a system call or by executing an OS command, and to receive the results of the service call or OS command. Examples of operating systems include, but are not limited to, Unix operating systems (e.g., Solaris OS provided by Sun Microsystems, Inc., and AIX provided by IBM), Linux operating systems (e.g., Red Hat Linux and Debian Linux), and the Windows family of operating systems provided by Microsoft Corporation (e.g., Windows XP, Windows Vista, and Windows CE).

The techniques for desktop management and delivery described herein provide for storing virtual personal disks at a data center, where each virtual personal disk stores a copy of the disk contents of a computing device serviced by the data center. "Personal Virtual Disk" (PVD), or just "virtual disk", refers to a set of images that collectively represents the data (or some portion thereof) that is stored at a computing device associated with the virtual disk. With a virtual personal disk, separate physical disks are not necessarily provided in the data center for each separate virtual disk; the virtual personal disk stores the disk contents of a specifically identified computing device that is used by a specifically identified user. As used herein, "image" refers to a set of data and executables that is at least a portion of the disk content that is stored at a computing device. An image may store data in compressed or non compressed form, and the data may be unformatted (e.g., binary data, raw disk blocks, raw data partitions, etc.) or structured as files and/or any other type of data structure format.

"Data center" refers to a combination of one or more computer systems and one or more storage devices that are communicatively and/or operatively connected to the computer systems, where the computer systems are operable to store and manage data in the storage devices. Examples of storage devices include, without limitation, hard disks, optical disks, and any other now known or later developed electromagnetic or solid-state storage devices. In various embodiments and implementations, a data center may use storage devices that are installed according to various types of storage configurations. Examples of such storage configurations include, but are not limited to, directly attached storage that includes physical disks installed in computer systems; arrays of physical disks (e.g., various RAID configurations); network-attached storage (NAS) that is connected to a network and that uses file-level protocols to provide file access to various network clients; storage area network (SAN) that provides for attaching remote storage devices (e.g., electromagnetic or optical disk arrays, tape devices, etc.) over a network fabric in such a way that the storage devices appear local to the OSs of computer systems, and that allows the OSs of the computer systems to access and operate on data in the storage devices at the disk block level; and any combinations of multiple different storage configurations.

According to the techniques for desktop management and delivery described herein, in one embodiment a system comprises multiple computing devices that are communicatively connected to a data center. The data center stores a separate virtual disk for each separate computing device. A virtual disk for a computing device comprises an image that includes: an OS for the computing device, including device drivers; one or more applications for a user of the computing device; machine state such as machine account ID and hardware-specific driver configuration; and user data and settings that are specific for the user of the computing device. The data center also comprises data center logic which is stored in a storage medium and which, when executed at the data center, is operable at least to: send images and/or updates of the images to the computing device; receive from the computing device changes made or caused by the user at the computing device to each of the OS, the one or more applications, the machine state and the hardware-specific driver configuration, and the user data and settings; and update the image for the computing device by applying the changes to each of the OS, the one or more applications, the machine state and the hardware-specific driver configuration, and the user data and settings. In this embodiment, the system further comprises device logic which is stored at each of the plurality of computing devices. When executed at a computing device, the device logic is operable at least to: receive the image from the data center; store the image in non-volatile storage medium at the computing device; and boot the computing device from the new OS that is stored in the non-volatile storage medium. While the user is using the computing device, the device logic at the computing device is further operable to: determine that the changes are made or caused by the user to each of the OS, the one or more applications, the machine state and the hardware-specific driver configuration, and the user data and settings that are stored in the non-volatile storage medium; and send the changes to the data center and cause the image for the computing device to be updated at the data center based on the changes.

According to the techniques described herein, in one embodiment a computing device comprises one or more processors, a non-volatile storage medium, and device logic that is stored in the non-volatile storage medium. When executed, the device logic is operable to receive an image for the computing device over a network from a data center. The image includes: at least a portion of an OS, where the portion includes a critical boot set of the OS; one or more applications for a user of the computing device; user data that is specific for the user of the computing device; and a machine profile comprising driver configurations for OS drivers, application configurations of the one or more applications, user configurations of the OS that are specific to the user and machine ID information. The device logic is further operable to: store the portion of the OS, the one or more user applications, the user data, and the machine profile in the non-volatile storage medium; instantiate the image based on the machine profile; and boot the computing device from the portion of the OS that is stored in the non-volatile storage medium. While the user is using the computing device, the device logic is operable to: determine that changes are made (or caused) and stored by the user to each one of the portion of the OS, the one or more applications, the user data, and the machine profile that are stored in the non-volatile storage medium; and send the changes over the network to the data center in order to cause the image to be updated based on the changes.

In other embodiments, the techniques for desktop management and delivery described herein provide one or more methods for performing the functionalities of the data center logic and the device logic as described above, and one or more computer-readable storage media that stores the data center logic and/or the device logic in the form of executable instructions.

2.0 Techniques for Desktop Management and Delivery

According to the techniques described herein, a system for desktop management and delivery comprises a data center and multiple computing devices, where the computing devices may connect (either periodically or continuously) to the data center over a network such as a LAN or a WAN. The disk contents of the computing devices are stored at the data center, where the disk content for each separate computing device is stored at the data center as a separate virtual disk. The disk content for a computing device is hosted in the data center so that it can be managed centrally and protected well. The OS, the software applications, and the various user data and user-specific configurations that comprise a disk content are executed or otherwise installed/configured at the corresponding computing device, with the ability to cache a working set of the disk content at the computing device in order to enable a user to use the computing device offline and with high performance, independent of the bandwidth and latency of the network. The techniques described herein provide for logic in several functional areas such as "downlink", "uplink", and "sandbox" functional areas.

As used herein, "logic" refers to a set of instructions which, when executed by one or more processors, are operable to perform one or more functionalities. In various embodiments and implementations, any such logic may be implemented as one or more software components that are executable by one or more processors or as any combination of one or more software and hardware components such as Application-Specific Integrated Circuits (ASICs). For example, any particular logic may be implemented, without limitation, as one or more software modules, as one or more libraries of functions, as one or more dynamically linked libraries, and/or as a standalone or a client-server software application.

According to the techniques described herein, "downlink" logic is operable to maintain the disk contents at the data center and to transfer the disk contents from the data center to the computing devices. The disk content of each computing device is migrated into the data center and the primary copy of the disk content is stored in a virtual personal disk as a set of images. (A virtual personal disk is also referred to as a "personal virtual desktop" or "PVD"). A particular virtual disk stored at the data center includes the entire content that is stored on one or more hard disks at a particular computing device—including, but not limited to, the OS, the software applications, the user data of the one or more users that use (e.g., that have logon accounts on) the computing device, machine configuration and machine IDs, and any other user-specific configurations and settings which may be fully or partially stored in a system registry at the computing device. In this manner, what is stored in the data center are the actual, entire, and current copies of the disk contents the computing devices, to the point that an instance of a computing device can be booted off the corresponding virtual disk that is stored at the data center.

The "downlink" logic is also operable to maintain a persistent cache of a "working set" on each individual computing device, which enables the computing device to operate when offline (e.g., for computing devices that are laptop computers) and to work fast when executing local applications by means of accelerating access to the virtual disks at the data center. An optimized image transport mechanism may be used transfer new images from the data center to the computing devices.

Further, "uplink" logic is operable to propagate to the data center all changes that are made or caused by the users of the computing devices to the disk contents at the computing devices. For example, any changes that are made by a particular user at a particular computing device (e.g., changes to the OS, the installed software applications, the user data, and to any user-specific settings or machine configurations and settings) are propagated back to the data center and are applied to the PVD for that particular computing device. The "uplink" logic is also operable to provide a full image recovery, which may include "shared" images (which are shared among multiple computing devices) and the "user delta" images that may include all user settings and personalization as well as user data.

Maintaining the entire disk contents of multiple computing devices as virtual disks at the data center enables IT administrators to extract common base images, e.g., elements of the operating system and core applications that are shared among a large number of computing devices, to perform management activities on a minimal (typically a handful) number of those shared images, and to propagate automatically any changes made to a shared base image onto each individual PVD that belong to the "base image" group. In particular, some elements of the base image include OS and software components and configuration, as well elements that are common to a family of hardware devices (e.g., all Dell hardware platforms with the same Hardware Abstraction Layer (HAL) may share a common image).

In an embodiment, "sandbox" logic is operable to support any user-installed or third-party applications that may be configured on the computing devices. The "sandbox" logic allows a user of a computing device to install and/or use "unsupported" applications, which run on an isolated sandbox at the computing device that protects the base image from local modifications. In addition, the "sandbox" logic may be operable to propagate all or part of the sandboxed area to the data center for protection. Sandboxing user-installed applications and data in this manner enables the protection of the shared image from tampering by the user, and hence enables true image instance management at the data center, while at the same time not forcing lockdown policies on the users that are highly restrictive and not realistic for some power user types (e.g., software engineers).

Since the PVD contains the entire image of the desktop contents and is the prime copy of that data, the computing device that actually boots and executes a given PVD is replaceable. In particular, a PVD instance can be booted and executed on a new computing device, e.g., if the previous computing device was lost or stolen. This enables full desktop restore capability. The new computing device may be of compatible hardware or of different hardware. In the latter case, the hardware profile of the new computing device is matched with the proper hardware-specific base image in the datacenter, and the PVD automatically re-binds itself to the new base-image.

Since a PVD can transition from one computing device to another as described above, it is also possible for a single PVD to migrate, or "roam" between computing devices. For example, a user that has a physical desktop and a laptop, would like to keep one logical PVD in the data center that is shared between the two devices. While at the office, the user can work with his desktop, and when traveling, the user can use his or her laptop, always using the common PVD, including the installed applications, machine state, user data and settings, and same OS. The only element that would be switched is the hardware-specific element(s) of the base image, as described above.

The techniques for desktop management and delivery described herein essentially decouple the IT management operations, which are performed on the individual virtual disks in the data center, and the user operations, which are performed on each computing device using that device's computing resources (e.g., CPU, RAM and I/O devices). According to the techniques described herein, the IT personnel maintain full central control and management over the disk images of the computing devices independently of WAN conditions, user-intervention, and online/offline status. The techniques described herein also enable troubleshooting and testing by IT personnel on images that store the actual, true disk contents of the computing devices. At the same time, the techniques described herein enable users of the computing devices to leverage the local CPU and other computing resources in order to experience the benefit of local computing, including offline operation for laptop computer users and network independence for local laptop operation. The techniques described herein effectively and seamlessly bridge and synchronize between two execution domains—the domain of centralized computing at the data center and the domain of localized computing at each individual computing device.

3.0 Example System for Desktop Management and Delivery

Figure 1B:
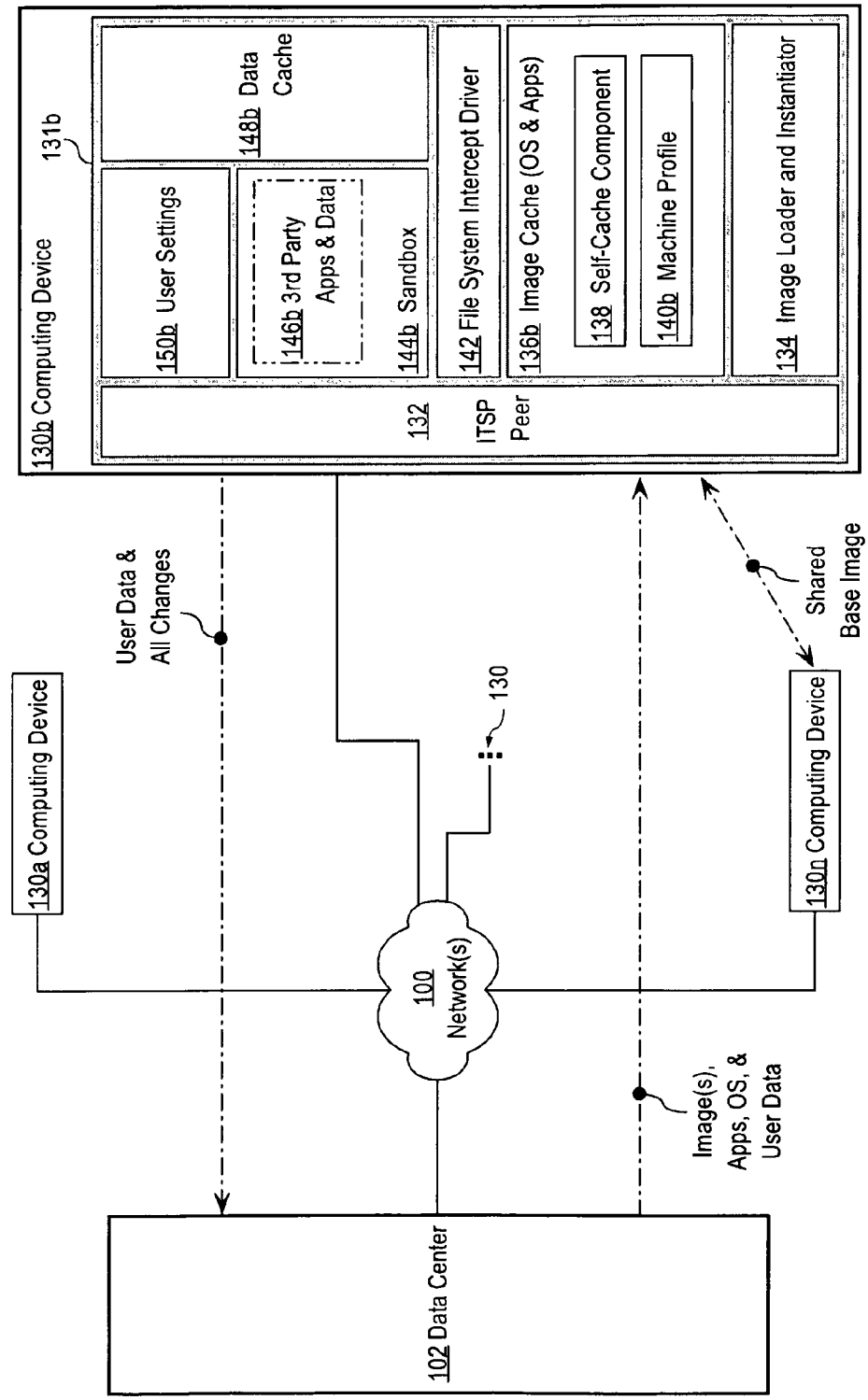
FIG. 1B is a block diagram that illustrates components of a computing device according to the example embodiment illustrated in FIG. 1A.

FIG. 1A and FIG. 1B collectively illustrate the components of an example system for desktop management and delivery according to one embodiment of the techniques described herein. The system comprises data center 102 and a (possibly quite large) number of computing devices 130. Computing devices 130 may connect to data center 102 over one or more networks 100, which may include one or more LANs or WANs. It is noted that the techniques described herein do not require computing devices 130 to be continuously and constantly connected to data center 102 in order to operate. Rather, the techniques described herein provide for computing devices that can operate "offline"—that is, users can use computing devices 130 without the computing devices being connected to data center 102. Thus, in the context of the techniques described herein, "offline" refers only to operating a computing device while the computing device is not connected to the data center; while operating "offline", the computing device may or may not be connected to one or more networks or the Internet.

3.1 Data Center Components

FIG. 1A is a block diagram that illustrates components of a data center in a system for desktop management and delivery according to an example embodiment. Data center 102 includes one or more computer systems 104 and one or more storage devices 110 that are communicatively and/or operatively connected to computer systems 104. Computer systems 104 are operable to store and manage data in storage devices 110. One or more administration management clients 120 are communicatively and/or operatively connected to computer systems 104 and storage devices 110. Administration management clients 120 are operable to allow the IT personnel to manage the disk contents stored on storage devices 110 either directly or through data center logic 106 in computer systems 104.

Personal Virtual Desktops

Virtual personals disks 112 are stored on storage devices 110. Each virtual personal disk is a set of images that collectively represents data that is stored at a particular computing device. For example, virtual disk 112a stores a set of images that store the data from computing device 130a, virtual disk 112b stores a set of images that store the data from computing device 130b, and similarly virtual disk 112n stores a set of images that store the data from computing device 130n.

In some embodiments, a virtual disk for a computing device may be modularized into different types of image elements that may be stored separately from each other and may be maintained differently from each other. An image element may include one or more files that are organized according some common maintenance and/or functional characteristic(s). Examples of such types of image elements include, without limitation, base image elements (which may include, for example, OS files that are shared among different computing devices), machine state elements (which may include, for example, configuration files that are specific to the corresponding computing device, but are not specific to any user of that device), and user area elements (which may include files that are specific to a particular user of the computing device). For example, in the embodiment illustrated in FIG. 1A, virtual disk 112a includes user state elements that are specific to a user of computing device 130a, and machine state elements that are specific to computing device 130a. Similarly, virtual disk 112b includes user state elements that are specific to a user of computing device 130b, and machine state elements that are specific to computing device 130b, and virtual disk 112n includes user state elements that are specific to a user of computing device 130n, and machine state elements that are specific to computing device 130n. As illustrated in FIG. 1A, base image 114 includes base image elements that are common to, and shared among, all of computing devices 130a, 130b, and 130n.

Each virtual disk of virtual personal disks 112 is associated with metadata information (not shown in FIG. 1A) that identifies the particular computing device associated with that virtual disk. The metadata information for a particular virtual disk may include: a virtual disk identifier that uniquely identifies that particular virtual disk; a device identifier that uniquely identifies a particular computing device that stores the disk content of that particular virtual disk; and any other data associated with the particular virtual disk and/or the particular computing device. The set of metadata information associated with virtual personal disks 112 is used by data center logic 106 to determine which virtual disk needs to be updated when disk content changes are received from a particular computing device, and to determine to which computing device to send images from a particular virtual disk.

According to the techniques described herein, each virtual disk of virtual personal disks 112 stores, or is otherwise associated with, a machine profile for the particular computing device associated with that virtual disk. The machine profile for a particular computing device is a set of data that may include: one or more unique identifiers of the particular computing device, such as a security identifier (e.g., SID), a device identifier (e.g., a MAC address), a device name (e.g., a unique domain name or a machine name), and one or more network addresses (e.g., an IP address); driver configurations for OS drivers; application configurations for one or more software applications that are installed on the particular computing device; OS configurations that are specific to the user(s) of the computing device; and any other configuration information that is specific to the hardware and/or software components of the particular device and/or to one or more users that have logon accounts on the particular device.

In embodiments in which the different computing devices use different hardware platforms and/or OSs, each virtual disk may store a critical boot set of the OS for the particular computing device associated with that virtual disk. As used herein, "critical boot set" of an OS refers to a set of files and configurations that are minimally necessary for booting a particular computing device. In these embodiments, the critical boot set of the OS for each computing device is specific to the hardware and OS of that particular device, and is therefore stored in the corresponding virtual disk. The critical boot set of the OS may or may not be also stored in the computing device at all times. If the critical boot set of the OS does not exist in the computing device at boot time, then mechanisms like Pre Execution Environment (PXE) may be used for network boot of the critical boot set. Once the critical boot set, which includes the self-caching component, is loaded over the network, subsequent operation of the system is supported by the self-caching mechanism, including streaming, on-demand caching, and de-duplication methods that expedite the download over WAN and execution of the PVD on the physical device. In this way, the techniques described herein ensure that the virtual disk for a particular computing device can always be used to boot the particular computing device without requiring any of the OS image to reside in the computing device.

Shared Base Image

In the embodiment illustrated in FIG. 1A, shared base image 114 is stored on storage devices 110. According to a de-duplicated data storage mechanism used in this embodiment, disk content shared among all users of all computing devices 130 is stored in shared base image 114, and user-specific and device-specific disk content is stored in the corresponding virtual personal disks 112.

Shared base image 114 may store data and applications that are common, and shared, across all users of all computing devices 130. For example, shared base image 114 may include a common OS and a set of core software applications that are used by all users of computing devices 130 such as, for example, e-mail clients and web browsers. In embodiments in which the different computing devices use the same hardware platform and OS, shared base image 114 may store a shared critical boot set of the OS that can be used to boot each computing device.

It is noted that in embodiments that use a shared base image, the entire disk contents of a particular computing device may be obtained by combining the shared base image with the private images in the virtual personal disk for that particular computing device. Collectively, the combination represents the PVD for that particular computing device. In some implementations, the shared base image or portions thereof may be transferred on their own to a computing device, and may be instantiated at the computing device with device-specific parameter values from the machine profile associated with that computing device. In other implementations, the shared base image may be combined with images from a virtual disk prior to transferring the combined images to the computing device associated with that virtual disk. In some embodiments, the system manager may decide to switch the base image for a particular PVD, e.g., because the person with which the PVD is associated, has changed departments and requires a new set of applications that are part of a different shared image. Another example might be that the user has refreshed his or her hardware, and therefore the PVD needs to point to a different base image.

In some embodiments, the techniques described herein provide for storing and maintaining image snapshots at the data center. At any given time, for each supported computing device, the data center may store in the virtual disk for that computing device some or all of the following: one or more "current" images that store data that is currently stored at the computing device; one or more "new" images that have been generated at the data center but that have not yet been transferred to the computing device; and a set of "old" images that have been previously stored at the computing device. The image snapshots stored at the data center for a computing device may be used by IT personnel to recover from generating and/or transferring a bad image to that computing device.

Image Transfer and Synchronization Protocol (ITSP) Server

Data center 102 comprises Image Transfer and Synchronization Protocol (ITSP) server 108. As used herein, "server" refers to a combination of integrated software components and an allocation of computational resources, such as memory, CPU time, and/or disk storage space, where the integrated software components are operable to perform one or more functionalities.

According to the techniques described herein, ITSP server 108 is operable to transfer images to computing devices 130. Each of computing devices 130 executes an ITSP peer that is operable to communicate with ITSP server 108 over the ITSP protocol. Depending on the characteristics of the networks over which it is implemented, the ITSP protocol may be implemented as an application or presentation layer protocol over a transport layer protocol (such as the Transmission Control Protocol (TCP)) or as protocol that operates on or below the transport protocol layer of the OSI communication stack.

In the embodiment illustrated in FIG. 1A, ITSP server 108 is optimized for transferring images over a WAN. ITSP server 108 is operable to determine how to transfer a set of images optimally to the correct computing device; what subset of images to transfer or when to transfer it (which is dictated by the image cache) is determined by data center logic 106. In order to achieve optimal image transfer, ITSP server 108 and the counterpart ITSP peers at the computing devices may utilize one or more of the following mechanisms:

- use the base images stored on the computing devices to perform data-redundancy elimination at the file level and data block level;
- use peer computing devices on the same LAN as 130's LAN to transfer elements of the shared base image 114 to each other; and
- perform prioritized pre-position based on anticipated usage, so that a user of a computing device can start working on the computing device with the newly transferred images as soon as a sufficient subset of these images are stored on the computing device, while the rest of the images are being downloaded in the background.

In some embodiments, the techniques described herein provide for efficient image transfer between a computing device and the data center by transferring only the differences (or deltas) between images that are stored both at the computing device and at the data center. This redundancy elimination may be performed both at the file level and at the file-block level. Because the transfer of data between the computing device and the data center is not synchronous (i.e., continuous and constant synchronization is not required), image transfers may be performed in two phases. In the first phase, only the signatures of the images and/or of the image blocks therein are transferred, and the signatures are then used to determine the differences between the copies of the images stored at the computing device and the data center. In the second phase, only the differences are requested and transferred between the computing device and the data center. This redundancy elimination may be performed cross-user and cross-application—in other words, the images for which redundancy elimination may be performed may belong to different users of the same computing device and/or for different applications of the same user.

It is noted that in some operational contexts (e.g., an operational context that supports wireless mobile devices), the ITSP server and peers may be further optimized to operate efficiently over transport protocols that are specifically designed to operate in these contexts. Thus, the example of ITSP optimizations provided herein is to be considered in an illustrative rather than a restrictive sense.

Data Center Logic

Data center 102 comprises data center logic 106 that may be executed on computer systems 104. According to the techniques described herein, data center logic 106 is operable to store, update, maintain, and cause the transfer of the images that are stored in virtual personal disks 112. For example, data center logic 106 is operable at least to: send images to computing devices 130; receive from computing devices 130 changes that are made by users to disk contents at the computing devices; apply the received changes to the corresponding virtual personal disks 112 in order to update the disk content stored in the images of the virtual personal disks; and receive and apply changes that are made to virtual personal disks 112 and shared base image 114 through administration management clients 120 by IT personnel.

Using computing device 130*b* as an example, consider some of the operations data center logic 106 may perform in maintaining the disk content stored in virtual disk 112*b* which is associated with computing device 130*b*. Suppose that by using an administration management client 120, an IT administrator submits commands to data center logic 106 to install a new software application on computing device 130*b*. Data center logic 106 receives the commands and, based on information received with the commands, identifies virtual disk 112*b* as the virtual disk to which the new software application is to be installed. Data center logic 106 then stores the files of the new software application in an image within virtual disk 112*b* and updates any necessary configuration files that are stored on that virtual disk. In this manner, data center logic 106 effectively installs the new software application onto virtual disk 112*b*. By using the metadata information associated with virtual disk 112*b*, data center 106 then identifies computing device 130*b* and initiates the transfer to that device of the image from virtual disk 112*b* that stores the new software application. Date center logic 106 may initiate the transfer of the image by calling (or otherwise notifying) ITSP server 108 of the identity of computing device 130*b*, and by passing to the ITSP server the image (or portions thereof) that needs to be transferred or a pointer that indicates the storage location in storage devices 110 of that image. Thereafter, ITSP server 108 transfers the image to the ITSP peer that is executing on computing device 130*b*, and the image is then loaded or otherwise configured onto computing device 130*b*, thus making the new software application available to the users of that computing device. It is noted that data center logic 106 is operable to handle in a similar manner any changes that are made to any disk content of virtual personal disks 112 including, but not limited to, changes that are made to OS files, software application files, user-specific files and other data, and to any user, application, and OS configuration files (including OS registry files).

Suppose now that a user of computing device 130*b* makes some configuration changes to a software application that is installed on that computing device. For example, a user of computing device 130*b* may configure specific settings for a new software application that has been installed from images transferred from data center 102. The changes to the user settings are transferred from the ITSP peer on computing device 130*b* to ITSP server 108. ITSP server 108 then calls (or otherwise) notifies data center logic 106 that image changes have been received from computing device 130*b*. Using the identity of computing device 130*b*, data center logic 106 checks the set of metadata information associated with virtual personal disks 112 and identifies virtual disk 112*b* as the virtual disk that stores the images to which the received changes need to be applied. Data center logic 106 then identifies which files in which image in virtual disk 112*b* need to updated, and then applies the received changes to update these files in the following manner. For files that were created originally by the user in computing device 130*b*, these files and any changes made to them afterwards are kept in virtual disk 112*b* as is. For files that were originally part of the read-only base image 114, duplicate copies of these revised files are kept in virtual disk 112*b*, hence not overwriting the read-only files that are shared with other users that share base image 114. These modified copies shadow the original copies that reside intact in the shared base image. That is, at computing device 130*b* the user sees the shadow files with changes made by the user, and not the original base image files stored in base image 114. However, a system manager can invoke a "cleanup" operation on the PVD, which causes the PVD to revert to its original form with respect to the base image (while user data changes are not impacted) and hence ensure operation of the computing device as expected by the IT personnel. In this manner, data center logic 106 ensures that the changes made by the user at computing device 130b are propagated and applied to the corresponding images stored in virtual disk 112b, thus synchronizing the current disk content stored at computing device 130b with the corresponding disk content stored in virtual disk 112b. It is noted that data center logic 106 is operable to handle in a similar manner any changes that are made to any disk content at computing device 130b including, but not limited to, changes that are made to OS files, software application files, user-specific files and other data, and to any user, application, and OS configuration files (including OS registry files).

In the embodiment illustrated in FIG. 1A, data center logic 106 is also operable to implement a de-duplicated data storage mechanism over storage devices 110, leveraging the fact that much of user data and application data will be duplicated across users and computing devices, as well as the fact that the access by computing devices 130 to data center 102 does not need to be continuous and real-time.

System Management Utilities

The techniques for desktop management and delivery described herein provide for a set of system management utilities that can be used by IT personnel to manage data center 102 and the data stored on storage devices 110. The system management utilities may include a variety of software tools that provide specific management functionalities. The system management utilities may be implemented as standalone or client-server applications and may be able to access data center 102 and its components (e.g., storage devices 110 and/or computer systems 104) through administration management clients 120. Administration management clients 120 may execute on computer systems (not shown) used by IT personnel (e.g., system administrators and network engineers), and are operable to allow the IT personnel to manage the disk contents stored on storage devices 110 either directly or through data center logic 106.

Through administration management clients 120, the system management utilities enable an IT administrator to perform any management activities locally on the images stored in data center 102 without the need to connect directly to any of computing devices 130 that are being configured. Examples of such management activities include, but are not limited to, OS and application updates, backup of user data, crash recovery, asset management, anti-virus scanning, troubleshooting, disk validation and disk integrity checking, and the like.

According to the techniques described herein, storing the entire disk content of a computing device at the data center allows an IT administrator to mount the images that include this content locally, and to locally perform any testing, troubleshooting, and asset management on the actual data of the computing device, including the user-specific settings, user-specific applications, and other user-specific data. In contrast, prior approaches for desktop management and delivery lack this capability because these approaches require the IT administrator to login remotely to the computing device, and/or because the virtual desktops stored in the data center do not include any user-specific applications and user-specific data that may be required for proper testing, troubleshooting, and asset management.

In some embodiments, the techniques described herein may provide a troubleshooting utility that is operable to cause virtual personal disks to be booted at the data center. For example, the troubleshooting utility may cause the data center logic to load one or more images from a specific virtual disk onto a hardware platform such as, for example, a standalone computer system that is communicatively connected to the data center or a blade that is operatively attached at the data center. The data center logic then causes the standalone computer system or the blade to boot from the loaded images, thus allowing an IT administrator access to a local instance of the corresponding computing device.

3.2 Computing Device Components

According to the techniques described herein, a computing device comprises device logic and a device cache that is stored on one or more non-volatile storage media at the computing device. The device cache may include one or more sub-caches such as image cache (for storing the OS code and data), data cache (for storing administrator-installed applications and data, and user-specific settings), and sandbox cache (for storing user-installed $3^{rd}$ party applications and data). The image cache dictates the minimal subset of images that is needed for offline operation, and keeps up-to-date metadata information that is tightly synchronized with the contents of a prime copy of the images that are stored in a data center.

According to the techniques described herein, the device logic is operable to boot or cause the computing device to boot from the device cache. The device logic may be implemented as an integrated software module or as multiple separate modules dedicated to performing specific functionalities. Examples of these functionalities include instantiation, swap, and merge. The instantiation functionality refers to loading a bootable portion of the OS on the computing device and correctly instantiating that bootable portion with the correct device-specific information so that the computing device can boot off that loaded OS portion. The swap functionality refers to seamlessly and transparently (to users and applications executing on the computing device) exchanging critical portions of the OS when such critical portions are updated based on newly received images from the data center. The merge functionality refers to seamlessly and transparently merging user data, user-specific applications, and other user-specific configurations with the base images that store the OS and the core software applications that are installed on the computing device.

In this manner, the techniques described herein allow a computing device to store, maintain, and boot from a single OS. It is noted that in case of virtual computing devices (e.g., virtual machines) that share a common physical computing device, it is still possible to have multiple (virtual) computing devices, each with its own single OS, to share a physical computing device, in which case the physical computing device effectively runs multiple OSs, one for each virtual computing device. The device cache at a computing device stores, and effectively caches, some or all PVD content including the OS installed on the computing device, and the computing device can be booted off the OS that is stored in the device cache. Further, all disk content of the computing device is stored and centrally maintained at the data center as a virtual personal disk. Thus, the techniques described herein provide for fully maintaining, delivering, installing, and using a single OS on each computing device.

FIG. 1B is a block diagram that illustrates components of a computing device in a system for desktop management and delivery according to an example embodiment. The computing device components are described with reference to computing device 130b for illustration purposes only. It is noted that the other computing devices 130 (e.g., computing devices 130a and 130n) include similar components that are different to the extent that these other computing devices store user applications and user data that are specific to the users that use (and/or have logon accounts on) these other computing devices.

Computing device 130b comprises one or more storage devices 131b and one or more processors (not shown in FIG. 1B). Storage devices 131b store device logic according to the techniques described herein, where the device logic includes ITSP peer 132, image loader and instantiator 134, self-cache component 138, file system intercept driver 142 and hooking mechanisms for certain APIs including but not limited to registry hooking and COM+ database hooking. Storage devices 131b also store a device cache that includes device-specific information; for example, the device cache may include image cache 136b, sandbox cache 144b, data cache 148b, and user settings cache 150b.

ITSP Peer

Computing device 130b comprises ITSP peer 132. According to the techniques described herein, ITSP peer 132 is a server that is operable to transfer images and data between computing device 130b and data center 102. ITSP peer 132 is operable to communicate with an ITSP server at data center 102 over an ITSP protocol that is optimized for transferring images over networks 100, which in the embodiment illustrated in FIG. 1B include a WAN.

In the downlink direction, ITSP peer 132 is operable to receive images from data center 102, where the images may include: OS images (of the entire OS and/or any portions thereof); machine profile 140b that includes hardware and/or software configuration information that is specific to computing device 130b; application images for software applications (both new installations and changes/updates thereto); and any changes to user data that have been made at data center 102 because of maintenance or protection activities (e.g., such as virus scanning). In the downlink direction, ITSP peer 132 may also be operable to receive shared base images from other peer computing devices. For example, for transfers of large shared images, ITSP peer 132 may be operable to check for peer computing devices that are on the same LAN and, if such peer computing devices exist (e.g., computing device 130n), to fetch from them copies of the large shared images. In some operational scenarios, receiving common and shared images from a peering computing device on the same LAN would be more efficient than receiving the same images from data center 102.

In the uplink direction, ITSP peer 132 is operable to transfer to data center 102 some or all changes that are made to the disk content that is stored on computing device 130b. Such changes may be made, or caused to be made, by a user or users of computing device 130b. Examples of such changes include, but are not limited to, changes to the OS and to core applications that are stored in image cache 136b, changes to the machine profile 140b that are caused by user activity, user-installed $3^{rd}$ party applications and data and any changes thereof, changes to user-specific files and other data, and changes to any user-specific settings and configurations.

ITSP peer 132 may use some different and/or additional optimization techniques in the uplink direction because of the specific characteristics of the data that is being transferred to data center 102. For example, while downlink data is mostly binary, and hence less compressible at the block level, user data transferred in the uplink direction is much more compressible at block level (due to redundancy across files of common blocks), and hence block level redundancy elimination may be highly beneficial. One example optimization technique that can be used for uplink data transfers may be based on the approach described by Muthitacharoen et al., in "*A Low-Bandwidth Network File System*", published in October 2001. Muthitacharoen et al. describes a low bandwidth file system (LBFS) that is specifically designed to operate over low bandwidth communication links.

In the uplink direction, ITSP peer 132 may also be optimized to propagate data asynchronously to data center 102 in order to avoid latency-related delays and save unnecessary updates of the same file. Further, ITSP peer 132 (and/or other components on computing device 130b) may be configured to propagate to data center 102 only a subset of the user files. For example, files such as "temporary Internet files", paging files, and other files that are transient in nature may not be propagated to data center 102. Additional files that may not be uploaded onto the data center include files that are explicitly filtered out by a centrally administered policy, such as personal music files. The policy is flexible enough to define what files to filter based on file types, names, or by their location in the file system.

Image Loader and Instantiator

Computing device 130b comprises image loader and instantiator 134. According to the techniques described herein, image loader and instantiator 134 is operable to receive images from data center 102, to store the received images into storage devices 131b, to initialize the received images based on device-specific information that is included in machine profile 140b, and to boot computing device 130b from the received images if and when necessary.

According to the techniques described herein, image loader and instantiator 134 is operable to validate and initiate a download of an image from data center 102 at boot time. For example, image loader and instantiator 134 may be invoked as part of the boot sequence of computing device 130b and, when invoked, is operable to authenticate and get authorized to access the correct images at data center 102, check whether any locally cached images in image cache 136b are valid, and initiate the download of any necessary images (or updates thereto) from data center 102 by invoking ITSP peer 132.

In addition to real-time image download and boot, image loader and instantiator 134 may also be operable to initiate a background image download, whereby a new image is downloaded in the background while computing device 130b is allowed to boot from an existing image that is cached in image cache 136b. If the background download of the new image completes successfully, on the next reboot computing device 130b may be allowed to boot from this new image. This functionality of image loader and instantiator 134 provides the capability to maintain one, two, or even more images on computing device 130—one of which is "current" (from which the computing device has been currently booted), one is possibly "new" (which has been newly received from data center 102), and the rest one or more images are "old" (which have been previously used to boot the computing device). Image loader and instantiator 134 is operable to load and instantiate any of the "current", "new", and "old" images.

Image loader and instantiator 134 is also operable to instantiate a received image on the fly with device-specific parameters that are included in machine profile 140b. For example, upon receipt of an image that includes a bootable portion of the OS (e.g., an image that includes the critical boot set of the OS), image loader and instantiator 134 is operable to patch the image with any necessary device-specific parameters. Examples of such device-specific parameters may include, without limitation, a machine name that is specific to computing device 130b, a security identifier (SID) that uniquely identifies computing device 130*b* in a particular domain, and any other device-specific parameters that are necessary for successful boot of computing device 130*b*. Image loader and instantiator 134 is also operable to instantiate a received image according to the hardware configuration of computing device 130*b* that is reflected in machine profile 140*b*. In this manner, by using an image loader and instantiator that can instate images on the fly at each computing device, the techniques described herein enable the use of a single base image throughout an enterprise.

For example, in some embodiments the image loader and instantiator may include logic for three separate elements. The first element is operable to instantiate the hardware and the OS drivers of the computing device based on hardware and driver configurations that are included in the machine profile of the device. The second element is operable to instantiate user applications based on application configurations that are included in the machine profile of the computing device. The third element is operable to instantiate the one or more machine identifiers of the computing device based on device-specific information that is included in the machine profile of the device.

In some implementations, the hardware instantiation of a computing device may be done by pre-loading images at the data center with a superset of pre-installed drivers, where the superset of drivers would include all drivers that are necessary to boot any of the computing devices supported by the data center. Upon receipt of such pre-loaded images, each image loader and instantiator at each computing device may be configured to instantiate and load only those drivers which are needed and used by that particular computing device to boot.

File System Intercept Driver

Computing device 130*b* comprises file system intercept driver 142. According to the techniques described herein, file system intercept driver 142 is operable to transparently intercept and redirect all access to the file system on computing device 130*b*. For example, file system intercept driver 142 transparently intercepts any file system calls from the software applications executing on computing devices 130*b*, and transparently re-directs these file systems calls to access the files that are stored in the device cache in computing device 130*b*. The files to which the file systems calls are redirected may include, without limitation, the files stored in image cache 136*b* (including OS registry files and any other critical OS files), the files stored in sandbox cache 144*b*, the files stored in user data cache 148*b*, and the files stored in user settings cache 150*b*. File system intercept driver 142 may be implemented as a file driver that uses a filter interface to intercept and redirect file system calls.

In some embodiments, the file system intercept driver may be operable to determine a minimal image for a particular user of the computing device, where the minimal image includes only those applications and only those user data which are accessed most frequently by that user. For example, the file system intercept driver may monitor the file paths of files that are accessed while the user is using the computing device, and may record information indicating the access frequency of all accessed files. Based on the recorded information, the file system intercept driver may then determine which applications and data are accessed most frequently by the user. The file system intercept driver may then propagate the recorded information to the data center for storing in the corresponding virtual personal disk. Subsequently, this information may be used at the data center to determine which images from the virtual personal disk need to be prioritized for transfer to the computing device.

Device Cache

The device cache stored on storage devices 131*b* in computer system 130*b* includes image cache 136*b*, sandbox cache 144*b*, data cache 148*b*, and user settings cache 150*b*.

Image cache 136*b* stores the OS images from which computing device 130*b* boots. Because of this, image cache 136*b* may be configured to span one or more bootable disk partitions of storage devices 131*b*. The image cache 136*b* may be structured to allow the use of shadow (or hidden) bootable disk partitions and to allow switching of disk partition paths when the critical boot set of the OS of computing device 130*b* is updated or replaced in images received from data center 102.

Image cache 136*b* dictates the minimal subset of images that is needed for offline operation of computing device 130*b*, and keeps up-to-date metadata information that is tightly synchronized with the contents of a prime copy of the images that are stored in data center 102.

Image cache 136*b* also stores machine profile 140*b* and the core software applications that are commonly used by the users of the computing devices supported by data center 102. Machine profile 140*b* stores configuration data that specifies: the configurations of the specific hardware components that are installed on computing device 130*b*; the driver configurations for OS drivers; the application configurations of the one or more software applications installed on computing device 130*b*; and any user configurations of the OS that are specific to the user. Machine profile 140*b* may alspo include configuration data that is specific to computing device 130*b* such as, for example, a security identifier (SID), a device identifier (e.g., a MAC address), a machine name, and one or more network addresses (such as IP addresses).

Image cache 136*b* also stores self-cache component 138. Self-cache component 138 is logic that operates as an extended component of the OS. Self-cache component 138 is operable to perform caching for any user data, software applications, and user-settings and configurations that may be stored in image cache 136*b*, sandbox cache 144*b*, data cache 148*b*, and user settings cache 150*b*.

In addition, self-cache component 138 is operable to cache itself and to cache any portions of the OS (including OS registry files and other critical OS files) into image cache 136*b*. Self-cache component 138 maintains in image cache 136*b* a sufficient subset of its own files so that it is operational at all times. Self-cache component 138 is also operable to allow changes that are made to critical components and portions of the OS at data center 102 to take effect immediately. When self-cache component 138 detects that such changes are received from data center 102, it causes image loader and instantiator 134 to reboot computing device 130*b* from the new OS images that include these changes. In this manner, self-cache component 138 effectively makes image cache 136*b* a "self-cache." By providing the self-caching of component 138 and of any other OS portions and components, the techniques described herein allow any updates and changes to the OS and the components thereof to be performed without running any executables (e.g., agents or clients) on computing device 130*b*. This is because all such updates and changes are performed on the OS images stored in data center 102, which images are subsequently propagated and cached in image cache 136*b*.

Sandbox cache 144b stores $3^{rd}$ party applications and data 146b. Sandbox cache 144b also stores any changes that are made to $3^{rd}$ party applications and data 146b by users at computing device 130b, and any changes received from data center 102 that were made by IT personnel to the images that store these $3^{rd}$ party applications and data at the data center. In addition, sandbox cache 144b provides a storage area for isolating and preventing certain executables (and data generated by those executables) from changing the OS images, including the OS registry files, that are stored in image cache 136b. For example, sandbox cache 144b is used when new or changed files, which are received from data center 102, are merged onto the corresponding images and files that are stored at computing device 130b. In this manner, sandbox cache 144b prevents an unintended overwriting of important files such as, for example, OS system DLL files.

Data cache 148b stores software applications that are not core applications but are installed on computing device 130b by the user or users of the device. Data cache 148b may also store any user-specific files that are generated, created, and used exclusively by the user or users of computing device 130b. Data cache 148b may operate as a conventional cache; in addition, or instead of, data cache 148b may operate in a "lazy" fashion. This means that all changes and updates to data in data cache 148b are first performed locally on computing device 130b, and are then propagated to data center 102 based on network bandwidth availability. In some implementations, data cache 148b may be configured by a centrally administered policy to eliminate the propagation to data center 102 of user data that does not need to be saved. Examples of such user data include, without limitation, web browser cached pages and temporary internet files, and personal data files such as music files that the enterprise is not interested to protect. In some embodiments, in addition to a data cache, a computing device may be configured to include a user-specific disk partition that stores user data that is not cached and propagated to data center 102. In these embodiments, such user-specific partitions may be configured for all users that use, or have a logon account on, the computing device.

User settings cache 150b stores any user-specific settings and configurations that are made and maintained by the user or users of computing device 130b. Examples of such user-specific settings and configurations include configuration files that are used by software applications (e.g., web browsers, media players, etc.) to personalize the applications' appearances and the content that is delivered to the specific user by these applications.

Common to all of image cache 136b, sandbox cache 144b, data cache 148b, and user settings cache 150b is the functionality of a cache. File system intercept driver 142 intercepts all read-write access to the file system, and determines for each file that is accessed whether that file exists in the corresponding cache and is valid (a "hit"), or whether that file is invalid or does not exist in the corresponding cache (a "miss"). File system intercept driver 142 is operable to initiate, on-demand, the fetching of a "miss" file into the corresponding cache. Alternatively, or in addition to, file system intercept driver 142 may be operable to initiate a pre-fetch for a file ahead of the time when that file would be accessed.

Specifically for image cache 136b, file system intercept driver 142 and/or self-cache component 138 are operable to: validate the freshness of requested files when computing device 130b is online (i.e., when the device is connected to data center 102); synchronize the files in image cache 136b with the remote prime copies of these files that are stored in the corresponding virtual personal disk at data center 102 (when computing device 130b is online); and fetch any files or other disk content that is not in image cache 136b but is stored in the corresponding virtual personal disk at data center 102. In this manner, the techniques described herein allow image cache 136b to store at any given time a sufficient working set of the OS and the core applications, which in turn allows the user or users of computing device 130b to operate it offline.

In some embodiments, the image cache that stores the OS and the core applications provides data structures for storing information that is used to "pin" certain disk content so that this content would not be evicted from the cache. Examples of such content are critical OS files and any other application files that are necessary for the proper operation of the computing device. In these embodiments, an "offline readiness indicator" may be stored as a flag in an associated data structure. The offline readiness indicator indicates whether the computing device is ready to operate offline.

3.3 Additional Features and Embodiments

According to the techniques for desktop management and delivery described herein, the entire contents of the hard drive (including OS files and configurations, software applications, and user data and settings) of each supported computing device are migrated and stored in a centralized data center as one or more images in a virtual personal disk. The virtual personal disks are efficiently stored in the data center, and this enables IT administrators to fully manage the desktop disk contents as if they were all physically local, thus not suffering from the network delays caused by slow WAN links and without regard as to whether the remote computing devices are online or offline. According to the techniques described herein, no management activities such as application installations and OS patches need to be performed on the actual physical computing devices, and any such management activities do not depend on the user activities or on the online/offline status of the computing devices. Rather, all management activities are performed centrally on the virtual personal disks stored at the data center, and any changes and updates caused by these activities are automatically propagated to the individual computing devices.

By providing for storing the entire disk contents of the supported computing devices as virtual personal disks at the data center, the techniques described herein allow an IT administrator to perform all updates and other management tasks locally on the images included in the virtual personal disks without the need to run any executables (such as agents or clients) on the remote computing devices either remotely or otherwise. A system in accordance with the techniques described herein automatically propagates any updated images to the remote computing devices either in real-time (i.e., as zero-delay updates) or when the computing devices come online. At the same time, the users of the computing devices can work completely transparently and can locally use the full computing resources of their computing devices.

Unlike existing approaches for enterprise desktop management that limit the users in the usage of their computing devices (for example, by requiring users to always be online, by restricting user activities through preventing users from being able to install applications, or by keeping a volatile state of the system and not preserving any changes made by the user to the system persistently across reboots), a system in accordance with the techniques described herein allows the users to avail themselves the full range of capabilities of their laptop computers, including installation and use of user-specific applications, programs, and online and offline operation. In particular, users can freely add and update their own user data locally at their laptop computers, and the central management provided by the techniques described herein does not affect these user capabilities.

Further, the existing approaches for enterprise desktop management do not provide mechanisms for checking for any image (or OS updates) in real-time, as they invariably require IT administrators to download patches to the remote laptop computers and to run the necessary executables in order to install the patches. In contrast, the techniques described herein provide for transferring an already updated image to the laptop computers and for intercepting any user-initiated operation or file system calls that are directed to the image at the laptop computers. This allows any image updates made or caused by user activities and operations to be propagated to the data center in real-time without sacrificing any user experience. Furthermore, the system described herein allows to apply "hot updates", i.e., make the changes coming from the data center to the running image without the need to interrupt the user or boot the device, except for a minimal set of files that would require reboot make the changes be in effect.

Another benefit of a system in accordance with the techniques described herein is that the system can provide "infinite storage" of hard drive space to the users of the supported computing devices. "Infinite storage" refers to a storage mechanism that is operable to store, for a particular computing device, disk content that is greater in size than the size of the hard disk space provided on that computing device. For example, if a user of a computing device needs more disk space, instead of installing an additional hard drive on the computing device, the central data storage allocated for this computing device in the data center may be increased. This means that when the user operates the computing device offline the user may not have every file locally. However, the techniques described herein may use various heuristics to determine which files are not essential for offline operation for this particular user of this particular computing device. Since it is likely that there will be a large number of these non-essential files, not all of these files need to be kept locally on the computing device at any given time. Further, because the techniques described herein provide highly optimized transfer mechanisms for image transfers to the computing device, during online operation any non-essential files may be fetched from the data center on-demand and transparently to the user applications as access requests for those files are intercepted at the file system of the computing device.

According to the techniques described herein, in some embodiments the contents of a virtual personal disk for a computing device may include: 1) base image that includes the OS and core, commonly used software applications; 2) user-specific images that include personal data, settings, and user-installed unmanaged applications; and 3) machine specific data that is associated with the computing device and not with a specific user, including the machine identifications (e.g., a machine ID) used to identify the computing device. At the data center, some of the image management activities performed by IT personnel may require a live desktop instance—for example, to test that a particular change made to the PVD is working as it should be. Since the data center only maintains virtual personal disks of all remote computing devices, but the execution of these PVDs occurs at the end point computing devices, the techniques described herein provide a way to support these management activities without requiring a physical device for each virtual personal disk stored in the data center, which would be very costly. It is noted that this cost problem is not addressed in the existing approaches for enterprise desktop management.

For example, a system in accordance with the techniques described herein maintains a single (or a small number of) universal shared OS images on a single computer system that may be operatively (e.g., as a blade) or communicatively connected to the data center, on which computer system an IT administrator can perform live updates. Further, the techniques described herein then provide an "instantiation" mechanism on each computing device, where the instantiation mechanism may include a self-cache component and/or image loader and instantiator logic that are operable to instantiate shared images with device-specific parameters. For example, a self-cache component operating from an image self-cache at each computing device may be augmented to perform a transformation function that automatically adapts the updated OS images received from the data center (including updates and changes to registry entries and configurations) into device-specific images (e.g., an image that is patched with a device-specific ID); and a reverse transformation function that is used for validating and checking the updated device-specific images if the received OS images have been updated compared to the images currently stored at the device.

In some embodiments, the data center stores a primary copy of a base image that may be reused for multiple hardware configurations. This primary copy is stored as a read-only shared base image. The primary copy of the base image is transformed when the image is transferred to a particular computing device, based on the specific hardware parameters of that computing device. This is in contrast to the currently accepted practices of hardware instantiation of devices. Further, this allows the techniques described herein to avoid duplication of hardware and software components at the data center side, which duplication is problematic for the existing approaches for desktop management.

In order be able to maintain a single copy of a shared OS image in the data center and to ensure that this shared OS image can be self-cached consistently by all target computing devices, care must be taken to prevent the computing devices from updating their local copies of the OS. On the other hand, many users want to be able to install their own applications locally (i.e. to not be locked down), which may affect OS system files that belong to the shared OS image. To address this problem, according to the techniques described herein any updates that are attempted to be made by a user at the computing device on files of the shared OS image are diverted to a special disk area on that computing device that shadows the files in the shared OS image. Further access requests to these OS files are served from the shadowed copies of the files. When updates to some of the shadowed files are received in an updated shared OS image from the data center, these updates are propagated to the shared OS image stored in the self-cache on the computing devices and are automatically merged with the shadowed copies of the OS files that are stored in the shadow disk area.

To further address this issue, in some embodiments the techniques described herein provide a single read-only primary OS image that is transformed when transferred to a computing device. On the computing device, this image is kept read-only by novel file system drivers that are operable to intercept access request calls from user applications to the image, and to store any user-caused changes as data within the data cache that stores the user-specific data.

For example, in some embodiments a data center may store a read-only base image that is shared among multiple computing devices. In these embodiments, if a user at a computing device makes changes to any of the files that belong to the read-only base image, a copy of the changed file is created and stored in a shadow disk area at that computing device. Thereafter, the copy of the changed file is transferred to and stored at the data center in the virtual disk for that computing device. The logic at the data center detects when the file from the read-only base image needs to be transferred to the computing device, and instead sends the copy of the changed file that is stored in the virtual disk for that computing device. In this manner, the actual file in the read-only base image is not changed or overwritten, while the user is still allowed to modify and use its own copy of that file. The changed copy of the file that is stored in the virtual disk "shadows" the original version of that file that is stored in the read-only base image. At the computing device, the file system intercept driver intercepts all requests to the original file, and re-directs these requests to the "shadow", user-changed file that is stored in the shadow disk area at the computing device. In this manner, the user at the computing device sees the "shadow" file, and not the original file from the read-only base image.

In some embodiments, the techniques for desktop management and delivery described herein provide logic that is operable to "lock-in" computing devices after the expiration of a timer. When a computing device is operating offline and the timer expires, the lock-in logic requires the user using the computing device to connect to the data center in order to obtain a new "lease" in order to continue to work; otherwise the lock-in logic places the computing device into "lock-in" mode, in which the user can continue to work but cannot use any peripheral device (e.g., a flush drive) to get data out of the computing device. This allows users to continue to work offline, but if the user is unauthorized (e.g., is no longer an employee of the enterprise), the user cannot export any data from the computing device. If the user does not connect to the data center to get authorized after an extended period of time, the lock-in logic completely locks the computing device and prevents the user from doing any more work. In addition, the lock-in logic may also wipe out some pre-determined contents (e.g., files or other data) from the hard disk(s) of the computing device. Since at the computing device these pre-determined contents are stored in a cache, the original copy of these contents is still stored at, and can always be obtained later from, the data center.

3.4 Example Operational Contexts

The techniques for desktop management and delivery described herein may be implemented in a variety of operational contexts.

In one example operational context, the techniques described herein may be implemented in a geographically dispersed enterprise that employs an enterprise network that includes a number of LANs that are connected over one or more WANs. In this operational context, in accordance with the techniques described herein, the enterprise employs a corporate data center that supports a large number of desktop computers, which are connected on their local LANs and which can connect to the data center over a WAN.

In another example operational context, the techniques described herein may be implemented in an enterprise in which the users use laptop computers. In this operational context, in accordance with the techniques described herein, the enterprise employs a corporate data center that supports a large number of laptop computers that can connect to the data center over one or more LANs, WANs, and/or over VPN connections that are established over the Internet.

In another example operational context, the techniques described herein may be implemented in a geographically dispersed enterprise in which the users may use both desktop computers and laptop computers. In this operational context, in accordance with the techniques described herein, the enterprise employs a corporate data center that supports both the laptop and the desktop computers, where the laptop and the desktop computers may connect to the data center over one or more LANs, WANs, and/or over VPN connections that are established over the Internet.

In another example operational context, the techniques described herein may be implemented in an enterprise (e.g., a government organization) in which the users are issued wireless mobile devices such as, for example, smart phones or PDAs. Another example of an enterprise in which this operational context may be implemented is a telecommunication company that provides wireless mobile services (e.g., cell phone services or wireless e-mail services) to a number of individual subscribers. In this operational context, in accordance with the techniques described herein, the enterprise may employ one or more data centers that support a large number of wireless mobile devices that connect to the data centers over one or more wireless data transfer protocols.

It is noted that the techniques described herein for desktop management and delivery are not limited to being implemented in any particular operational context. Rather, the techniques described herein may be implemented in any operational context that provides for use of computing devices that can execute an OS and that allow users to execute user-installed applications and to store user-specific data.

4.0 Self-Cache and Self-Cache Operation

According to the techniques described herein for desktop management and delivery, each computing device that is supported by a data center is configured with a self-cache that includes a self-cache component. The self-cache is a designated storage area on the storage devices (e.g., hard disks) of a computing device, and the self-cache component is logic that operates as an extended component of the OS of the computing device.

According to the techniques described herein, the self-cache component is operable to perform caching for any user data, software applications, and user settings and configurations that may be stored in various caches on a computing device. In addition, the self-cache component is operable to cache itself and to cache any portions of the OS (including OS registry files and other critical OS files) which also contain the self-cache logic. That is, the self-cache may have some of its own data and program files missing in the execution platform, in which case it would know to fetch them when they are needed. Hence the term "self-cache", i.e., a caching component that caches its own logic. The self-cache component maintains a sufficient subset of its own files so that it is operational at all times. In case those files have been corrupted or not operational, a network boot (e.g., using PXE mechanism) of the critical boot set, from the PVD, which includes the self-caching mechanism, can be performed to bootstrap the device without relying on any system component in the physical device. The self-cache component is also operable to allow changes that are made to critical components and portions of the OS at the data center to take effect immediately after being propagated to the computing device. When the self-cache component detects that critical changes are received in updated OS image from the data center, the self-cache component causes an image loader and instantiator to reboot the computing device from this updated OS image, in which case the changes that were made to the critical components take effect on the next boot. In this manner, the self-cache component effectively makes the image cache that stores this OS image a "self-cache," and enables the user to continue to operate transparently on the computing device and to directly address local hard drives both when online and when offline, without being aware of the data center that stores the entire disk contents of the computing device in a virtual personal disk. In this manner, by providing the self-cache component, the techniques described herein allow any updates and changes to the OS and the components thereof (including changes to the self-cache component) to be performed on the PVD in the data-center, eliminating the need and overhead of running agents or requiring the end user to perform installation, upgrade, and configuration of the changes on the computing device.

In a standard caching mechanism, an application at computing device C1 issues a request to access a remote file F1 from a server S1. The caching sub-system at computing device C1 intercepts the request, checks if it has a local valid copy of file F1, and if it does it serves the local copy of file F1 to the application that requested the file. Otherwise, the caching sub-system at computing device C1 uses the existing client-server protocol to access file F1 on server S1 on behalf of the application. Thus, in the standard caching mechanism, the caching sub-system at computing device C1 is one-sided, residing only on the computing device.

Figure 2:
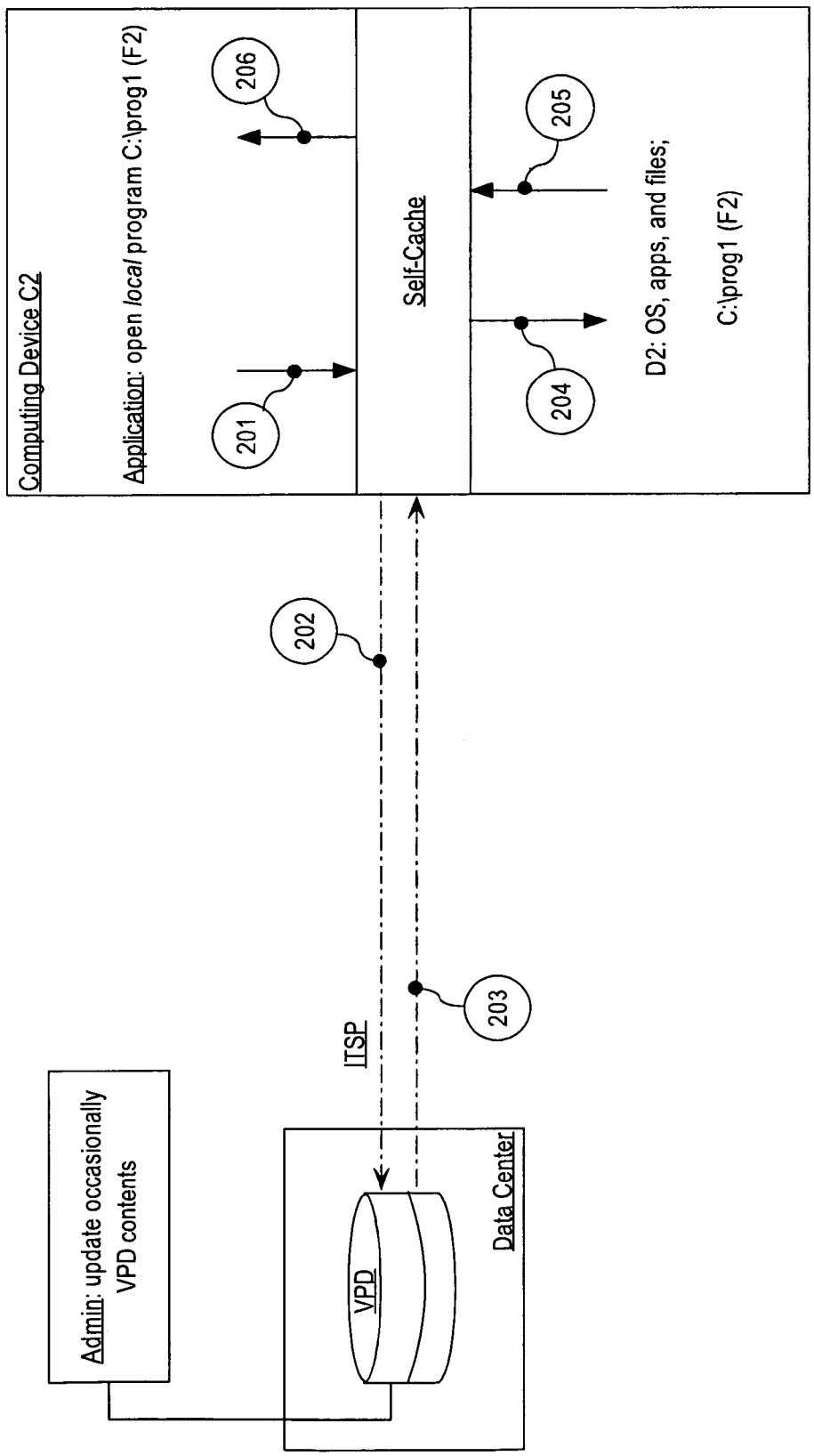
FIG. 2 is a flow diagram that illustrates a method for accessing a self-cache with a self-cache component according to an example embodiment.

In contrast to the standard caching mechanism, the techniques described herein provide a self-cache that stores a self-cache component. FIG. 2 is a flow diagram that illustrates a method for accessing a self-cache with a self-cache component according to an example embodiment of the techniques described herein.

In step 201, an application on computing device C2 issues a request to access a local file F2 from the local hard disk D2. File F2 may be any file including, but not limited to, a standard file, an OS file, and an executable program file that the user wants to run locally.

In response to the request for file F2, in step 202 the self-cache component in the self-cache accesses the data center over a data transfer protocol to check and determine if an updated remote copy of file F2 exists on the virtual personal disk that is stored in the data center for computing device C2.

If an updated remote copy of file F2 exists in the virtual personal disk in the data center, in step 203 the self-cache component fetches that updated remote copy of file F2 over the data transfer protocol, and in step 206 serves that updated copy of file F2 to the requesting application.

If an updated remote copy of file F2 does not exist in the virtual personal disk in the data center, in step 204 the self-cache component accesses the local copy of file F2 that is stored in the local file system on hard disk D2. In step 205 the self-cache component fetches that local copy of file F2, and in step 206 serves that local copy of file F2 to the requesting application.

In this manner, the self-cache and the self-cache component implement a two-sided caching system. The self-cache at the computing device side and the virtual personal disk at the data center side both cache copies of the same file, and a data transfer protocol (e.g., ITSP) is used to transfer copies of the file between the computing device side and the data center side. The application at the computing device, however, is not aware of the cached file copy stored in the virtual personal disk at the data center, but only knows about the file that is stored on the local hard disk D2.

According to the techniques described herein, in some embodiments the self-cache and the self-cache component ensure through two WAN-efficient mechanisms that the computing device and the applications thereof operate on the latest updates that are made to the images on the virtual personal disk that is stored at the data center for the computing device. One of these mechanisms may be implemented as logic which is operable to perform real-time reactive validation against the virtual personal disk and which may be executed upon receipt of each local request at the computing device. The other mechanism may be implemented as logic which executes at the data center and which is operable to proactively push image updates to the computing device. Conversely, the computing device includes logic which is operable to propagate to the corresponding virtual disk at the data center any updates that are made by a user on the local hard disk at the computing device. These updates are propagates asynchronously to the data center depending on network bandwidth and availability. To save network bandwidth and disk space on the virtual personal disk, the self-cache component at the computing device may exclude from propagation any temporary files, or files that are part of standard caching of remote servers such as web browser cache files, or any files that the system administrator is not interested in uploading such as private music files, which are filtered by a centrally administered policy. The policy is flexible enough to define what files to filter based on file types, names, or by their location in the file system.

In some embodiments, the self-cache component may be operable to generate an updated OS image on a separate hidden (or shadow) bootable partition on the hard disk(s) of the computing device. The updated OS image on the hidden partition may contain changes that resulted from an update that was made on the OS image in the virtual personal disk at the data center. After generating the updated OS image on the hidden partition, the self-cache component may be operable to transparently switch partition paths so that the next reboot of the computing device would be performed from the partition that stores the updated OS image.

In some embodiments, a self-cache component may be operable to determine the critical boot set of the OS at the computing device. For example, the self-cache component may monitor file access paths during the boot sequence of the computing device, and may record a set of boot information that identifies the files accessed during the boot sequence. In these embodiments, the self-cache component may propagate the boot information to the data center and may cause the data center to store the boot information in the machine profile for the computing device that is stored in corresponding virtual personal disk. Subsequently, the boot information may be used at the data center to determine how updates are to be made to the files included in the critical boot set of the OS for that particular computing device.

In some embodiments, a computing device may be configured with logic that is operable to check (periodically, on boot, or upon user request) if an OS image is valid (e.g., not infected by a virus), by comparing it efficiently against the copy of that image that is stored in the corresponding virtual personal disk at the data center. If the logic detects a difference, the logic performs an image invalidation operation and if necessary requests a new image from the data center. If a new image is to be requested, the logic holds up the computing device at its current state until the new image has been received. One example implementation of this functionality can be done by maintaining image signatures at each directory or for the critical components, and comparing the signatures between the image copy in the virtual personal disk and the image copy stored at the computing device. If there is a mismatch between the signatures, a new version of the image needs to be requested from the data center.

5.0 Implementation Mechanisms—Hardware Overview

Figure 3:
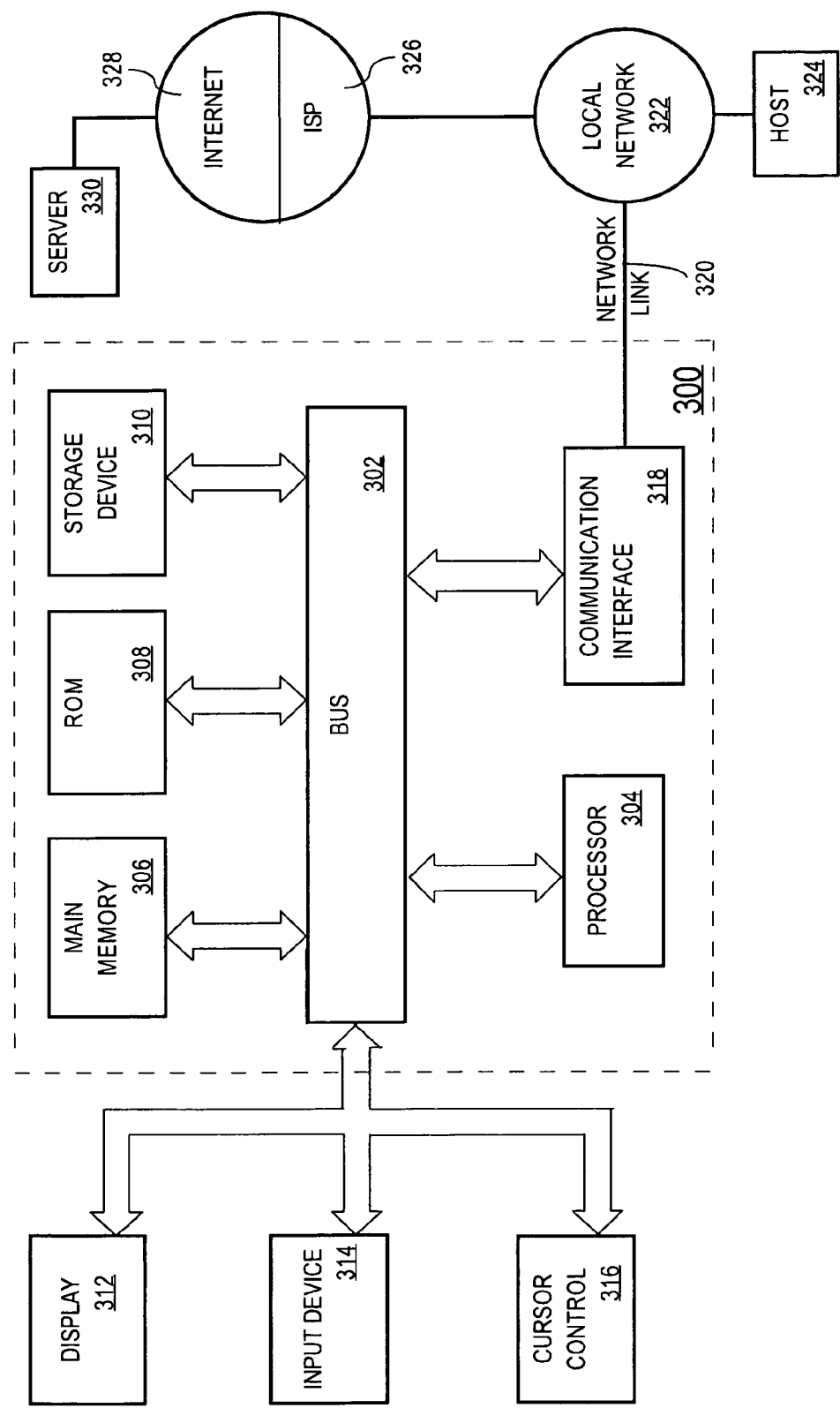
FIG. 3 is a block diagram that illustrates an example computer system on which embodiments may be implemented.

Depending upon a particular implementation, the techniques described herein may be implemented in any context and on any kind of computing platform or architecture, and are not limited to any particular context, computing platform, or architecture. For purposes of explanation, FIG. 3 is a block diagram that illustrates an example computer system 300 upon which embodiments of the techniques described herein may be implemented. For example, computer system 300 may be used to implement the functionalities of a data center in accordance with the techniques described herein. In another example, computer system 300 may be used to implement the functionalities of a computing device in accordance with the techniques described herein.

Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein for desktop management and delivery. According to one embodiment, those techniques are performed by computer system 300 in response to processor 304 executing one or more sequences of one or more instructions contained in main memory 306. Such instructions may be read into main memory 306 from another computer-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a machine to operate in a specific fashion. In an embodiment implemented using computer system 300, various computer-readable media are involved, for example, in providing instructions to processor 304 for execution. Such a medium may take many forms, including but not limited to storage media and transmission media. Storage media includes both non-volatile media and volatile media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine such as, for example, a computer system.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the worldwide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. The received code may be executed by processor 304 as it is received, and/or stored in storage device 310, or other non-volatile storage for later execution. In this manner, computer system 300 may obtain application code in the form of a carrier wave.

6.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system comprising:
    a plurality of computing devices; and
    a data center communicatively connected to the plurality of computing devices, wherein the data center comprises:
        a plurality of virtual disks, wherein a separate one of the plurality of virtual disks is associated with each separate computing device of the plurality of computing devices, wherein each virtual disk of the plurality of virtual disks comprises an image that includes:
            an Operating system (OS) for the associated computing device;
            one or more applications for a user of the computing device;
            a machine profile associated with the computing device;
            user data and settings that are specific for the user of the computing device;
        first logic which is stored in first storage medium and which, when executed at the data center, is operable at least to:
            send at least a bootable portion of the OS from the image to the computing device;
            wherein the bootable portion of the OS is stored in second non-volatile storage medium at the computing device, and the bootable portion of the OS is instantiated at the computing device based on the machine profile;
            wherein the bootable portion of the OS, which is instantiated and stored in the second non-volatile storage medium, is used to boot the computing device on the next reboot of the computing device;
            receive, from the computing device, changes made by the user on the second non-volatile storage medium at the computing device to each of the OS, the one or more applications, the machine profile, and the user data and settings; and
            update the image in the virtual disk corresponding the computing device by applying, at the data center, the changes to each of the OS, the one or more applications, the machine profile, and the user data and settings.

2. The system as recited in claim 1, wherein the image for the computing device includes a caching component, wherein the caching component is operable to store, in a cache at the computing device, the image and the changes made by the user at the computing device to each of the OS, the one or more applications, the machine profile, and the user data and settings.

3. The system as recited in claim 2, wherein the changes made by the user at the computing device comprise one or more modifications to each of the OS, the one or more applications, the machine profile, and the user data and settings that are stored in the cache at the computing device; and the first logic is further operable to apply the one or more modifications to the image that is stored at the data center.

4. The system as recited in claim 1, wherein the OS for the computing device includes a critical boot set of the OS; the changes made by the user to the OS comprise one or more modifications to the critical boot set of the OS; and the first logic is further operable to apply the one or more modifications to the critical boot set of the OS that is included in the image for the computing device stored at the data center.

5. The system as recited in claim 1, wherein the first logic is further operable to: receive, at the data center, user input that defines one or more operations on the virtual disk for the computing device; and perform, at the data center, the one or more operations on the virtual disk for the computing device.

6. The system as recited in claim 5, wherein the one or more operations include one or more of: a backup operation; a virus-scanning operation; a validation operation that validates the integrity of the virtual disk; an install operation that installs a software application on the virtual disk; or a disk management operation for the virtual disk.

7. The system as recited in claim 1, wherein the first logic is further operable to: load, at the data center, the image for the computing device on a hardware device; and cause the hardware device to boot from the OS included in the image.

8. The system as recited in claim 1, wherein the data center further comprises a plurality of machine profiles, wherein a separate one of the plurality of machine profiles is associated with each separate computing device of the plurality of computing devices; wherein the machine profile associated with the computing device includes configuration information specific to the computing device and to the user of the computing device; and the first logic is further operable to: receive, from the computing device, boot information that describes a critical boot set of the OS; and
    store the boot information in the machine profile associated with the computing device.

9. The system as recited in claim 1, wherein the image comprised in the virtual disk for the computing device is a minimal image that includes only those applications and only those user data which are accessed most frequently by the user at the computing device.

10. The system as recited in claim 1, wherein the first logic is further operable to continuously maintain at least a current snapshot of the image for the computing device.

11. The system as recited in claim 1, wherein the data center and the plurality of computing devices are communicatively connected over a Wide Area Network (WAN).

12. The system as recited in claim 1, wherein the plurality of computing devices includes one or more of a laptop computer, a desktop computer, a wireless mobile device, or a virtual machine.

13. The system as recited in claim 1, wherein the data center further comprises a base image that is shared by, and is common for, each separate virtual disk for each separate computing device of the plurality of computing devices.

14. The system as recited in claim 1, further comprising second logic which is stored at each of the plurality of computing devices and which, when executed at the computing device, is operable at least to:
    receive the bootable portion of the OS and the rest of the image from the data center;
    store the image in the second non-volatile storage medium at the computing device;
    boot the computing device from the bootable portion of the OS that is stored in the second non-volatile storage medium;

while the user is using the computing device, determine that the changes are made by the user to each of the OS, the one or more applications, the machine profile, and the user data and settings that are stored in the second non-volatile storage medium;

while the user is using the computing device, send the changes to the data center and cause the image in the virtual disk corresponding to the computing device to be updated at the data center based on the changes.

15. The system as recited in claim 14, wherein the image includes a caching component, wherein the caching component is operable to store, in a cache at the computing device, the image and the changes made by the user at the computing device to each of the OS, the one or more applications, the machine profile, and the user data and settings; wherein the changes made by the user at the computing device comprise one or more modifications to each of the OS, the one or more applications, the machine profile, and the user data and settings that are stored in the cache at the computing device; and wherein the second logic is further operable to: send the one or more modifications to the data center; and cause the image to be updated at the data center based on the one or more modifications.

16. The system as recited in claim 14, wherein the second logic is further operable to receive, from the data center, one or more modifications to one or more of the OS and the one or more applications; apply the one or more modifications to update the one or more of the OS and the one or more applications that are stored in the second non-volatile storage medium at the computing device.

17. The system as recited in claim 14, wherein the second logic is further operable to: determine a critical boot set of the OS at the computing device; and send, to the data center, boot information that describes the critical boot set of the OS.

18. The system as recited in claim 17, wherein the second logic is further operable to: receive, from the data center, one or more modifications to the critical boot set of the OS; in order to generate an updated critical boot set of the OS, apply the one or more modifications to the OS that is stored in the second non-volatile storage medium at the computing device; and reboot the computing device from the updated critical boot set of the OS.

19. The system as recited in claim 14, wherein the second logic is further operable to: allow the user of the computing device to cause one or more modifications to all files and configurations stored at the computing device; send the one or more modifications to the data center; and cause the virtual disk for the computing device to be updated at the data center based on the one or more modifications.

20. A computing device comprising:
one or more processors;
a non-volatile storage medium; and
logic which is stored in the non-volatile storage medium and which, when executed by the one or more processors, is operable at least to:
receive, over a network, an image for the computing device, wherein the image includes:
at least a portion of an Operating system (OS), wherein the portion includes a critical boot set of the OS;
one or more applications for a user of the computing device;
user data that is specific for the user of the computing device; and
a machine profile comprising driver configurations for OS drivers, application configurations of the one or more applications, and user configurations of the OS that are specific to the user;
store the portion of the OS, the one or more user applications, the user data, and the machine profile in the non-volatile storage medium;
instantiate the image based on the machine profile;
boot the computing device from the portion of the OS that is stored in the non-volatile storage medium;
while the user is using the computing device, determine that changes are made and stored by the user to each one of the portion of the OS, the one or more applications, the user data, and the machine profile that are stored in the non-volatile storage medium; and
while the user is using the computing device, send the changes over the network in order to cause the image to be updated based on the changes.

21. The computing device as recited in claim 20, wherein a single OS is installed on the computing device, and wherein the portion of the OS included in the image is part of the single OS installed on the computing device.

22. The computing device as recited in claim 20, wherein the machine profile included in the image comprises hardware configurations of one or more hardware components that are configured specifically for the computing device.

23. The computing device as recited in claim 20, wherein the logic is further operable to receive one or more remaining portions of the OS while the user is using the computing device.

24. The computing device as recited in claim 20, wherein the logic is further operable to request and receive one or more remaining portions of the OS in response to input from the user, wherein the input specifies one or more operations that attempt to access the one or more remaining portions of the OS.

25. The computing device as recited in claim 20 wherein, while the user is using the computing device, the logic is further operable to receive, over the network, one or more modifications to the critical boot set of the OS; in order to generate an updated critical boot set of the OS, apply the one or more modifications to the portion of the OS that is stored in the non-volatile storage medium at the computing device; reboot the computing device from the updated critical boot set of the OS.

26. The computing device as recited in claim 20, wherein the logic operable to instantiate the image is operable to perform one or more of: instantiate the OS drivers based on the driver configurations included in the machine profile; instantiate the one or more applications based on the application configurations included in the machine profile; instantiate the portion of the OS with one or more machine identifiers that are included in the machine profile.

27. The computing device as recited in claim 20, wherein the computing device is one of a laptop computer, a desktop computer, a wireless mobile device, or a virtual machine.

28. A non-transitory computer-readable storage medium comprising first logic which, when executed by one or more processors at a data center that is communicatively connectable to a plurality of computing devices, is operable at least to:
send at least a bootable portion of an Operating System (OS) from an image to a computing device of the plurality of computing devices, wherein the image includes:
the OS for the computing device;
one or more applications for a user of the computing device;
a machine profile associated with the computing device;
user data and settings that are specific for the user of the computing device;

wherein the data center comprises a separate virtual disk for each separate computing device of the plurality of computing devices, wherein a virtual disk for the computing device comprises the image;

wherein the bootable portion of the OS is stored in second non-volatile storage medium at the computing device, and the bootable portion of the OS is instantiated at the computing device based on the machine profile;

wherein the bootable portion of the OS, which is instantiated and stored in the second non-volatile storage medium, is used to boot the computing device on the next reboot of the computing device;

receive, from the computing device, changes made by the user on the second non-volatile storage medium at the computing device to each of the OS, the one or more applications, the machine profile, and the user data and settings;

update the image in the virtual disk for the computing device by applying, at the data center, the changes to each of the OS, the one or more applications, and the user data.

29. The non-transitory computer-readable storage medium as recited in claim 28, wherein the image for the computing device includes a caching component, wherein the caching component is operable to store, in a cache at the computing device, the image and the changes made by the user at the computing device to each of the OS, the one or more applications, the machine profile, and the user data.

30. The non-transitory computer-readable storage medium as recited in claim 29, wherein the changes made by the user at the computing device comprise one or more modifications to each of the OS, the one or more applications, the machine profile, and the user data and settings that are stored in the cache at the computing device; wherein the first logic, when executed by the one or more processors at the data center, is further operable to apply the one or more modifications to the image that is stored at the data center.

31. The non-transitory computer-readable storage medium as recited in claim 28, further comprising second logic that is installable at each of the plurality of computing devices, wherein the second logic when executed at the computing device is operable at least to:

receive the bootable portion of the OS and the rest of the image from the data center;

store the image in the second non-volatile storage medium at the computing device;

boot the computing device from the bootable portion of the OS that is stored in the second non-volatile storage medium;

while the user is using the computing device, determine that the changes are made by the user to each of the OS, the one or more applications, the machine profile, and the user data and settings that are stored in the second non-volatile storage medium;

while the user is using the computing device, send the changes to the data center and cause the image in the virtual disk for the computing device to be updated at the data center based on the changes.

32. A non-transitory computer-readable storage medium comprising logic which, when executed by one or more processors at a computing device, is operable at least to:

receive, over a network, an image for the computing device, wherein the image includes:
  at least a portion of an Operating system (OS), wherein the portion includes a critical boot set of the OS;
  one or more applications for a user of the computing device;
  user data that is specific for the user of the computing device; and
  a machine profile comprising driver configurations for OS drivers, application configurations of the one or more applications, and user configurations of the OS that are specific to the user;

store the portion of the OS, the one or more user applications, the user data, and the machine profile in the non-volatile storage medium;

instantiate the image based on the machine profile;

boot the computing device from the portion of the OS that is stored in the non-volatile storage medium;

while the user is using the computing device, determine that changes are made and stored by the user to each one of the portion of the OS, the one or more applications, the user data, and the machine profile that are stored in the non-volatile storage medium; and while the user is using the computing device, send the changes over the network in order to cause the image to be updated based on the changes.

33. The non-transitory computer-readable storage medium as recited in claim 32, wherein a single OS is installed on the computing device, and wherein the portion of the OS included in the image is part of the single OS installed on the computing device.

* * * * *